United States Patent [19]

Louboutin et al.

[11] 4,435,286
[45] Mar. 6, 1984

[54] LIQUID FILTER DEVICE

[75] Inventors: Robert Louboutin, Crespières; Michel Riotte, Garches, both of France

[73] Assignee: Degremont, Malmaison, France

[21] Appl. No.: 390,623

[22] Filed: Jun. 21, 1982

[30] Foreign Application Priority Data

Jun. 25, 1981 [FR] France ................. 81 12462

[51] Int. Cl.³ ............................. B01D 23/20
[52] U.S. Cl. .................. 210/116; 210/274; 210/275; 210/293
[58] Field of Search ............ 210/111, 274, 275, 289, 210/291, 293, 116

[56] References Cited

U.S. PATENT DOCUMENTS

| 1,871,122 | 8/1932 | Kretzschmar | 210/274 |
| 2,453,345 | 11/1948 | Row et al. | 210/274 |
| 4,076,625 | 2/1978 | Scholten et al. | 210/274 |
| 4,118,322 | 10/1978 | San Roman | 210/293 |
| 4,338,202 | 7/1982 | Louboutin | 210/293 |

Primary Examiner—Ivars C. Cintins
Attorney, Agent, or Firm—Wenderoth, Lind & Ponack

[57] ABSTRACT

A liquid filter device includes an upwardly open structure having a bottom and a floor positioned above the bottom, the bottom and the floor defining therebetween a chamber. A filter element comprising granular material is supported by the floor within the structure. Liquid to be treated passes downwardly through the granular material in contact with a gas passing upwardly through the granular material during a normal filtering and processing operation. During an operation for washing the granular material, water and gas pass upwardly through the granular material. A plurality of nozzles open into the granular material and have stems communicating with the chamber. The plurality of nozzles includes first nozzles having openings for, during the normal operation, passing liquid from the granular material into the chamber, and for, during the washing operation, distributing the water and gas from the chamber into the granular material. The plurality of nozzles further includes second nozzles having openings for, during the normal operation, distributing the gas from the chamber into the granular material, and for, during the washing operation, distributing the water and gas from the chamber into the granular material.

8 Claims, 3 Drawing Figures

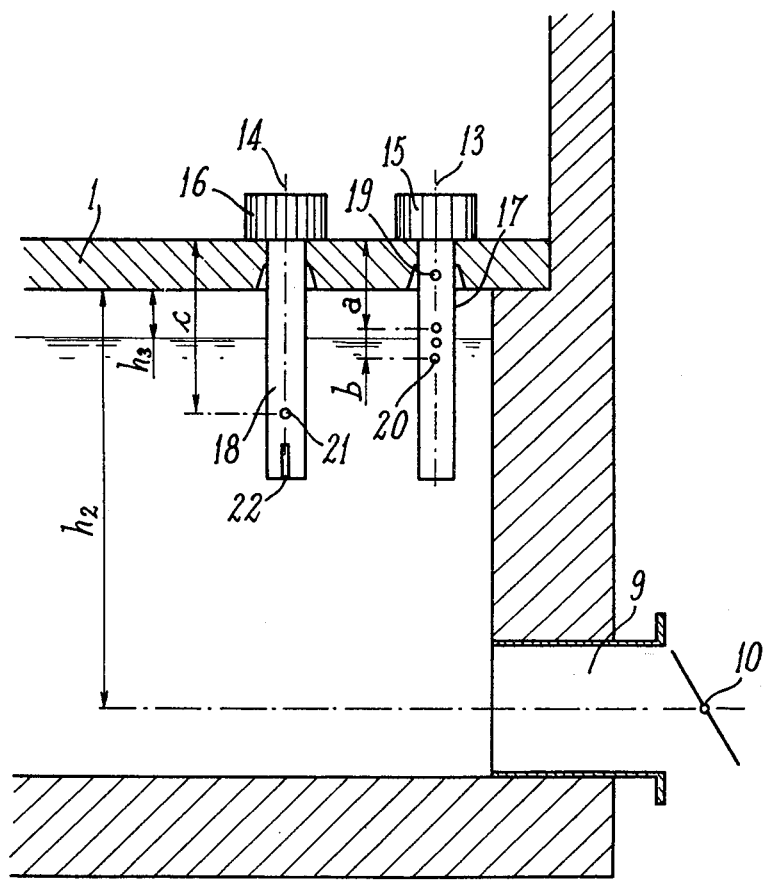

4,435,286

LIQUID FILTER DEVICE

BACKGROUND OF THE INVENTION

The present invention relates to a liquid filter of the type filled with granular material wherein a liquid to be processed flows downwardly through totally immersed granular material, during which the liquid to be processed is placed in contact with a gas which circulates upwardly through the granular material.

This type of filter is employed for processing various types of water, and in particular for achieving nitrification of water, a process which consists of causing oxidation of organic and ammoniacal nitrogen into nitrites, and then into nitrates, through the action of specific bacteria. Since these bacteria grow only in aerobic media, the nitrification process requires dissolving in the water to be processed a certain quantity of oxygen which is a function of the flow of water to be processed and of the quantity of nitrogen to be oxidized. The required quantity of oxygen, originating for instance from the atmospheric air, therefore is introduced into the filter. In general, the air is injected from the bottom to the top of the filter through the granular material of the filter.

Because of the bacterial growth inherent to this type of nitrification process, a clogging of the granular material eventually occurs, and the granular material accordingly eventually must be cleaned by a washing operation involving water and air.

This type of filter, filled with granular material, normally is in the form of an enclosure structure, for example of cement, which is upwardly open and which includes a bottom and a floor positioned above the bottom, the floor supporting the granular filter material. The granular filter material is immersed in the liquid to be processed, such that the liquid to be processed circulates downwardly through the bed of granular material and is discharged below the floor. The floor is fitted with nozzles which allow for the introduction of water and air for washing the filter by circulation from the bottom to the top through the filter material, when it becomes necessary to undergo a washing operation.

In this type of filter, conventionally the gas required for development of the nitrification process is distributed through a system of perforated tubing positioned above the floor in the area of the nozzles through which the water that has flowed downwardly through the granular material is drained. This type of conventional arrangement has a number of inherent disadvantages. The construction is complicated. A network of tubing must be placed within the granular material. Since this network of tubing is subject to a degree of stress which varies depending on the amount of clogging within the granular filter material, it becomes necessary to support the network of tubing. Distribution of the nitrifying gas through such a network of tubing can be properly achieved only if the flow rate of the gas does not vary substantially from the initial value taken into account during calculations for the filter device. It is apparent that for the system to be economical, the gas flow must be adjusted to the flow of water to be processed and to the quantity of nitrogen to be oxidized, both of which are variable parameters of the particular processing installation. Such an adjustment, which must not be detrimental to the qualitative results of the process, can be obtained only if the distribution of gas in the granular filter material remains accurate when its flow decreases. Otherwise, anaerobic areas would form locally within the granular filter material, and such anaerobic areas would be harmful to the living nitrifying bacteria and thus detrimental to the quality of the processing operation. Moreover, as the bacteria growth would be arrested in such anaerobic areas, such areas would form locations of minimum clogging through which the water to be processed would have a greater tendency to pass. Further, the presence of the network of tubing above the floor supporting the granular material disturbs the flow of fluids during a washing operation and thus is detrimental to the efficiency of the washing operation.

SUMMARY OF THE INVENTION

With the above discussion in mind, it is the object of the present invention to provide a liquid filter device of the type employing a granular filter material and which remedies and avoids the disadvantages of the conventional structures described above.

This object is achieved in accordance with the present invention by the provision of a liquid filter device including an upwardly open structure having a bottom and a floor positioned above the bottom, the bottom and the floor defining therebetween a chamber. A filter element comprising granular material is supported by the floor within the structure. Liquid to be treated is supplied to pass downwardly through the granular material in contact with a gas passing upwardly through the granular material during normal operation of the device. During a washing operation wherein the granular material is washed, water and gas pass upwardly through the granular material A plurality of nozzles open into the granular material and have stems which communicate with the chamber. The plurality of nozzles include first nozzles having opening means, for, during the normal operation, passing the liquid from the granular material through the floor and into the chamber, and for, during the washing operation, distributing the washing water and gas from the chamber into the granular material. The plurality of nozzles further include second nozzles having opening means for, during the normal operation, distributing the gas from the chamber into the granular material, and for, during the washing operation, distributing the water and gas from the chamber into the granular material.

Thus, in accordance with the present invention, the filter includes first and second types of nozzles which simultaneously provide for drainage of the liquid treated in the filter and distribution of the gas, air, oxygen enriched air or oxygen circulating upwardly through the filter and allowing nitrification of the liquid to be processed. The two types of nozzles together provide for distribution of water and air upwardly into the granular material during a washing operation.

The two types of nozzles include perforated heads which rise above the floor into the granular filter material and hollow stems which extend through the floor into the chamber located between the floor and the bottom and into which the filtered and processed liquid is collected. The gas to be distributed through the granular filter material during normal operation is supplied into this chamber and passes therefrom into the granular filter material through the second type of nozzles. During a washing operation both the water and air for washing are introduced into the chamber and pass therefrom through both types of nozzles into the granular filter material. The stems of the two types of nozzles have orifices which differ in number and location. The stems of the first type nozzles have two openings, one in the form of an orifice and one in the form of a slit. The stems of the second type nozzles each have an upper orifice and a lower orifice means which may be in the form of a slit or in the form of a plurality of vertically spaced orifices separated by a certain distance from the upper orifice, and the lower of which is positioned at a level higher than the level of the upper orifices in the first type nozzles.

The total area of the orifices in all of the second type nozzles is such that the pressure of the gas introduced into the chamber beneath the floor, above the collected filtered liquid, is always less than the pressure loss caused by a filtered liquid outlet valve, positioned in a side channel connected with the filtered liquid collection chamber.

In one advantageous configuration of the invention, the plurality of lower spaced orifices in the second type nozzle stems are equidistantly spaced from each other and have equal cross sectional sizes.

In another configuration of the invention, the plurality of lower orifices in the second type nozzle stems are replaced by a single slit having a size equal to the combined size of the lower spaced orifices in the first configuration.

The level of the liquid to be filtered is maintained constant above the granular filter material by an automatic adjustment of the opening of the filtered liquid outlet valve.

During the operation of washing the clogged granular filter material by a counter flow of water and air, the water and air simultaneously are introduced into the chamber located beneath the floor, with the water on the bottom and the air on the top. The thickness of the layer or curtain of air is such that the air is distributed through all of the nozzles in a uniform fashion through the clogged filter, with the air flow employed during the washing operation being up to ten times more than the flow of air employed during the normal filtration operation.

BRIEF DESCRIPTION OF THE DRAWINGS

Other objects, features and advantages of the present invention will be apparent from the following detailed description of a preferred embodiment thereof, with reference to the accompanying drawings, wherein:

FIG. 3 is an enlarged partial cross sectional view of a portion of the structure thereof.

DETAILED DESCRIPTION OF THE INVENTION

Figure 1:
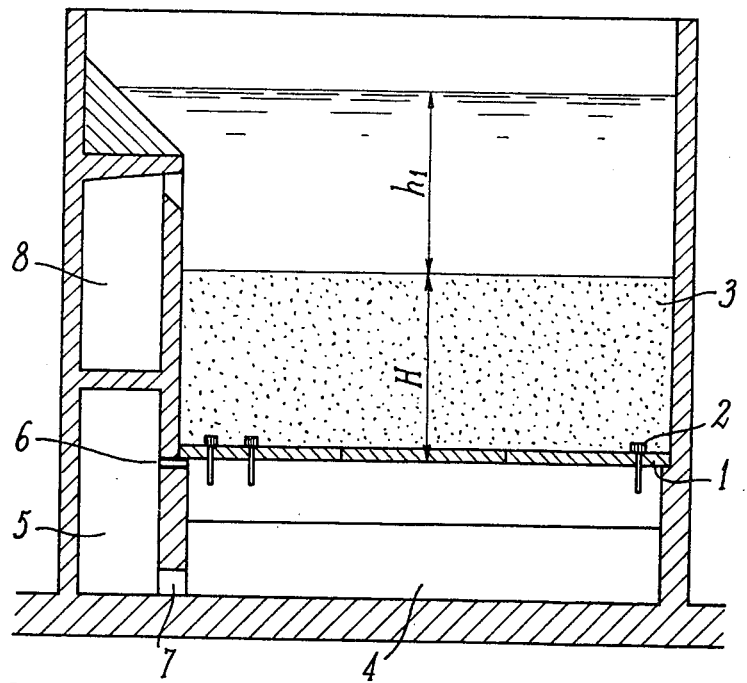
FIG. 1 is a transverse schematic cross sectional view of one embodiment of the liquid filter device of the present invention.

The following description relates to a filter device for nitrification of water. However, this is intended to be an exemplary description only and not limiting to the scope of the invention, since it is intended that the present invention be implemented in any arrangement whereby a gas and liquid circulate in counterflow directions through a totally immersed granular material. Furthermore, in the specifically illustrated and described arrangement the filter device includes an enclosure having a rectangular or square section. This however again is not intended to be limiting to the scope of the invention.

The filter device of the invention includes an enclosure having a floor 1 positioned a predetermined height above the bottom of the enclosure. Floor 1 is fitted with a plurality of nozzles 2 and supports a load of granular material 3, the upper level of which is at distance H from the lower surface of the floor 1. Chamber 4, defined between the lower surface of floor 1 and the bottom of the enclosure, is connected with a channel 5, at its upper part through a series of orifices 6 and at its lower part by other orifices 7. The upper orifices 6 are designed to distribute, to a position beneath the floor 1, the air required for the nitrification process during normal operation and the air needed for washing the granular material 3 during a washing operation. The lower orifices 7 are employed during normal operation for collecting the processed and filtered water, and during the washing operation for distributing the water needed for this operation. Above channel 5, a spout 8 is provided for dispensing the liquid to be processed onto the granular mass during normal operation and for recovery of the washing water distributed from beneath the floor 1 during the washing operation.

Figure 2:
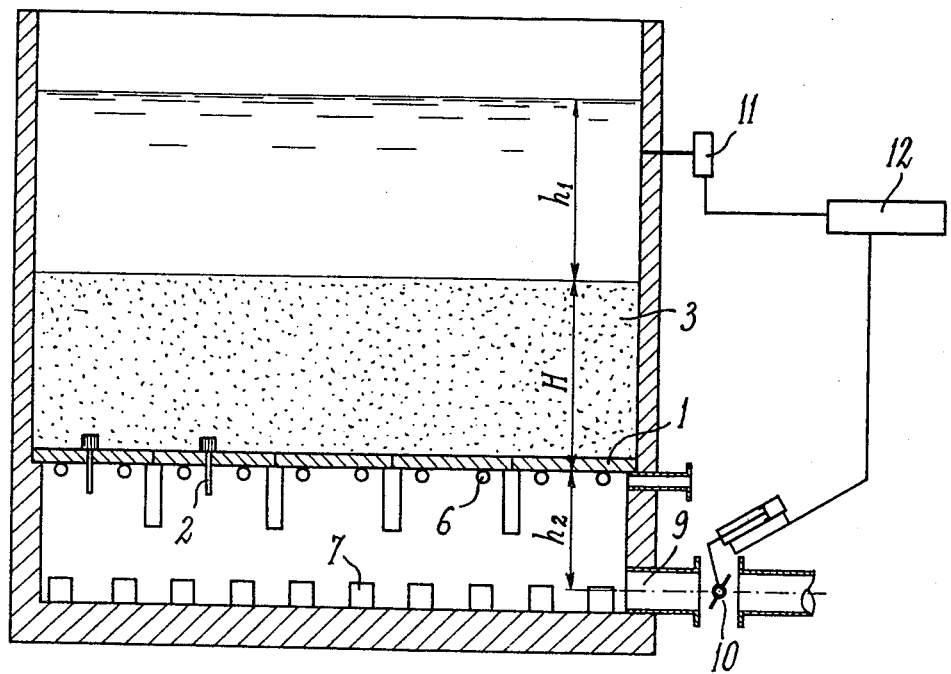
FIG. 2 is a longitudinal sectional view thereof.

As shown in FIG. 2, an outlet pipe 9 for the processed or filtered water extends from channel 5 and is provided with a valve 10, the extent of opening of which is controlled by a regulator 12 which receives a signal emitted by a sensor 11 which measures the level of the water in the enclosure, in such a way as to maintain this level at a fixed height $h_1$ above the granular material 3, regardless of the flow of water being processed and/or the level of clogging of granular material 3 within maximum limits determined by the hydraulics of the system, the axis of valve 10 being at a distance $h_2$ from the bottom of floor 1.

As shown in FIG. 3, the floor 1 is provided with two types of nozzles 13 and 14, the heads 15 and 16 of which are identical, and the stems 17 and 18 of which are of equal length and equal internal diameter. The stem 17 of nozzle 13 is pierced at an upper portion thereof by an orifice 19 with a size or section $s_1$. At a distance "a" from its collar or head 15, stem 17 has therein, along a length "b", a series of "n" staggered or spaced orifices 20, each of which advantageously may have any equal size or section $s_2$, and which may be equidistantly spaced. According to another embodiment of the invention, orifices 20 may be replaced by a slit having a size or section equal to $n \times s_2$.

During the phase of normal operation of the device, the water which circulates from top to bottom through the granular mass 3 is collected at the level of floor 1 by nozzles of type 14, while the air required for the nitrification process, which circulates from bottom to top, is introduced beneath floor 1 and penetrates into the granular mass through nozzles of type 13.

The stem 18 of nozzle 14 has therein, at a distance "c" from its collar or head 16, such that $c > a + b$, an orifice 21 having size or section $s_3$, and a slit 22 at its lower portion.

During the phase of washing the clogged granular material with water and air, the two fluids circulate from bottom to top through both types of nozzles.

The following description of the operation of a filter equipped with $N_1$ nozzles of type 13 and $N_2$ nozzles of type 14 will provide a better understanding of the principle of the invention.

The water to be processed is dispensed over the granular mass 3, for instance by spout 8, and traverses the mass and penetrates into chamber 4 through nozzles 14 and 13, at least with regard to the latter at the beginning of the cycle. From this chamber, the filtered water drains through orifices 7 into the channel 5, from which it is evacuated to the outside through pipe 9 and valve 10. The degree of opening of valve 10 is adjusted by regulator 12 based on information provided by a level sensor 11, so as to maintain a constant distance $h_1$ between the water plane in the filter and the level of granular material 3. When the device is at the beginning of the cycle and therefore clean, by designating $\Delta p_m$ as the loss of pressure expressed in meters of fall of water consecutive to the flow of water through the granular mass, $j_1$ as the loss of pressure when passing through nozzles 14, $j_2$ as the loss of pressure due to drainage into pipe 9, these latter two pressure losses also being expressed in meters of fall of water, assuming for instance that recovery of water by pipe 9 occurs at atmospheric pressure at the level of its axis, distance $h_1$ will be held constant if there is an equality between the flow of water entering the device and the flow of water leaving it. This assumes that valve 10 causes a pressure loss equal to the excess pressure due to the flow entering the device. The degree of opening of valve 10 thus will be adjusted automatically by the regulator 12 in such a way that, for this flow, the valve 10 creates a pressure loss equal to $H + h_1 + h_2 - (j_1 + j_2 + \Delta p_m)$.

The nitrifying air is introduced into the upper portion of channel 5 from which it circulates in a direction counter to the flow of the processed water and penetrates into chamber 4 through the upper orifices 6, beneath floor 1, where the pressure is $H + h_1 - (j_1 + \Delta p_m)$. Since pipe 9 is defined in such a way that its pressure loss $j_2$ is very low in front of $h_2$, the pressure under the floor 1 being less than the pressure loss created by valve 10, the air tends to escape through orifices 19 in the top portions of stems 17 of nozzles 13. Because of the pressure loss created by the passing of air through orifices 19, an air cushion develops beneath the floor, with a thickness of $h_3$ and at a dominant pressure equal to $H + h_1 + h_3 - (j + \Delta p_m)$. The total section $N_1 \times s_1$ of orifices 19 is determined in such a way that thickness $h_3$ of the air cushion is sufficient to provide, for the minimum flow of nitrifying air, a uniform supply to all $N_1$ of the nozzles 13, and thus a homogeneous distribution of air within the granular material.

If the air flow needed for nitrification increases, height $h_3$ increases up to the point where one or more of orifices 20 are uncovered. The distance between orifices 20 is determined in such a way that, taking into account defects in the horizontal alignment of the floor 1, the difference, from one nozzle 13 to another, of the number of orifices 20 exposed to the air is not more than one. The number of orifices 20 is determined taking into account the precision desired for equal distribution of the air flow. The greater the number of orifices 20, the better this equality of distribution. In addition, the total section or area of the orifices 19, 20 in all of the nozzles 13, i.e. $N_1(s_1 + n \, s_2)$, is determined in such a way that, for the maximum flow of nitrifying air corresponding to the maximum thickness $h_3$ of the air cushion, this thickness is such that orifices 21 of nozzles 14 are not uncovered. The nitrifying air in this case is exclusively distributed by nozzles of type 13.

It has been found that this was indeed the case and that as soon as nozzles 13 pass air they no longer play a role in water recovery. On the contrary, it was found that after an air-lift phenomenon was created inside stems 17, an ascending water current is created in nozzles 13. Water thus is brought from the chamber 4 to positions above the floor 1 through nozzles 13 and returns to chamber 4 through nozzles 14.

When the granular material becomes clogged due to the growth therein of the bacterial culture, the water outlet valve 10 is opened to such an extent that the reduction of its resulting pressure loss exactly compensates for the increase in pressure loss of the granular material. When the maximum admissible value $\Delta p_m$ of the pressure loss of the granular material is reached, the degree of opening of the valve 10 is such that it creates a pressure loss equal to $H + h_1 + h_2 - (j_1 + j_2 + \Delta p_m)$. The air pressure beneath the floor 1 is then $H + h_1 + h_3 - (j_1 + \Delta p_m)$, and since $h_2 - j_2$ is always greater than $h_3$, this pressure remains less than the pressure loss created by the valve 10, and the air introduced beneath floor 1 continues to pass through the orifices in nozzles 13 and to circulate naturally from bottom to top through the granular material.

When the granular material becomes sufficiently clogged, it must be washed in a conventional manner, by subjection to a simultaneous ascending current of air and water.

To perform this washing operation, after closing valve 10, water and air are introduced into channel 5, with the water penetrating into chamber 4 through the lower orifices 7 and the air penetrating through the upper orifices 6. Because the flow of air is higher during the washing operation than during the nitrification operation, beneath floor 1 an air cushion is formed, with a thickness greater than the maximum value of $h_3$. This causes orifices 19 and the "n" orifices 20 of each of the $N_1$ nozzles 13, and orifice 21 and an area portion $s_4$ of slit 22 of each of the $N_2$ nozzles 14 to be exposed to the air.

Under these conditions, if q is the maximum flow of air for nitrification and Q is the flow of air for washing, by adopting the value $N_1 = (p/Q)(N_1 + N_2)$ for $N_1$, and values which hold true for $s_1 + n s_2 = s_4$ for area $s_3$ of orifice 21 and area portion $s_4$ of the uncovered portion of slit 22, it can be seen that all the nozzles pass essentially equal quantities of air. The water for washing penetrates into the stems of all of the nozzles, which are of identical diameters, through their lower extremities. Homogeneous washing of the entire granular mass is obtained in this manner.

It should be noted that in the drawings only a few of the nozzles 2 (13 and 14) are shown. It is to be understood however that a plurality of such nozzles are provided throughout the area of floor 1.

Although the present invention has been described and illustrated with regard to a specifically preferred embodiment thereof, it is to be understood that such embodiment is intended to be illustrative only, since many modifications and changes to the specifically described and illustrated structural configuration may be made without departing from the scope of the present invention.

What we claim is:

1. A liquid filter device for use in nitrification of the liquid, said device comprising:
    an upwardly open structure having a bottom and a floor positioned above said bottom, said bottom and said floor defining a chamber;
    a filter element comprising granular material supported by said floor within said structure, liquid to be treated passing downwardly through said granular material in contact with a gas passing upwardly through said granular material during normal operation, and water and gas passing upwardly through said granular material during a washing operation thereof;

a plurality of nozzles opening into said granular material and having stems extending into said chamber;

said plurality of nozzles including first nozzles having opening means for, during said normal operation, passing said liquid from said granular material into said chamber, and for, during said washing operation, distributing said water and gas from said chamber into said granular material, said opening means of each said first nozzle comprising an upper orifice and a lower slit; and said plurality of nozzles further including second nozzles having opening means for, during said normal operation, distributing said gas from said chamber into said granular material, and for, during said washing operation, distributing said water and gas from said chamber into said granular material, said opening means of each said second nozzle comprising an upper orifice and lower orifice means positioned at a level above the level of said upper orifice of said first nozzle.

2. A device as claimed in claim 1, further comprising means for, during said normal operation, introducing said gas into said chamber and for creating therein an air cushion between said floor and said liquid in said chamber.

3. A device as claimed in claim 1, wherein said lower orifice means of said second nozzle comprises a plurality of vertically spaced orifices spaced below said upper orifice of said second nozzle.

4. A device as claimed in claim 3, wherein said plurality of orifices are equidistantly spaced and are equal in size.

5. A device as claimed in claim 1, wherein said lower orifice means comprises a slit.

6. A device as claimed in claim 1, further comprising means for, during said normal operation, introducing said gas into said chamber and for creating therein an air cushion between said floor and said liquid in said chamber, and wherein the total area of said upper orifices of all of said second nozzles is defined such that the height of said air cushion is sufficient to permit, for a minimum supply of said gas during normal operation, a uniform supply of said gas to all of said second nozzles and therefore a homogeneous distribution of said gas within said granular material.

7. A device as claimed in claim 6, wherein the total area of said upper orifices and said lower orifice means of all of said second nozzles is such that, for a maximum supply of said gas during normal operation, said upper and lower orifices of said first nozzles remain submerged within said liquid in said chamber.

8. A device as claimed in claim 1, further comprising outlet means for discharging filtered liquid from said structure, valve means for controlling the discharge of said filtered liquid through said outlet means, level detector means for detecting the level of said liquid in said structure above said granular material, and control means, operatively connected to said level detector means and to said valve means, for controlling said valve means in response to the liquid level detected by said level detector means to maintain said level constant.

* * * * *